(12) United States Patent
Funatogawa et al.

(10) Patent No.: US 6,678,804 B1
(45) Date of Patent: Jan. 13, 2004

(54) APPARATUS AND METHOD FOR MEMORY ACCESS CONTROL

(75) Inventors: Kazuo Funatogawa, Machida (JP); Yoshiharu Kato, Tama (JP); Masanobu Ogata, Tachikawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/545,079

(22) Filed: Apr. 7, 2000

(30) Foreign Application Priority Data

Apr. 28, 1999 (JP) .......................................... 11-121868

(51) Int. Cl.⁷ .......................... G06F 12/00; G06F 13/00
(52) U.S. Cl. ........................................ 711/154; 711/104
(58) Field of Search ................................ 711/104, 154; 358/1.9, 1.16

(56) References Cited

U.S. PATENT DOCUMENTS 5,467,437 A * 11/1995 Fuse .......................... 358/1.16
5,864,817 A * 1/1999 Galbi .......................... 704/503

* cited by examiner

Primary Examiner—Reginald G. Bragdon
Assistant Examiner—Pierre M. Vital
(74) Attorney, Agent, or Firm—Robert M. Trepp; F. Chau & Associates, LLP

(57) ABSTRACT

The present invention relates to an apparatus and method for reducing the frequency with which memory is accessed in graphic printing or the like. If a CPU 100 reads image data from a buffer block where data has not been written, a memory controller 12 does not read the image data from a image buffer 140, but sends back initializing data stored beforehand. If image data is going to be written for the first time in a buffer block, the memory controller 12 stores and manages this image data, first writes the initializing data in this buffer block, and thereafter writes the image data. If a read request or a write request occurs to a buffer block where data has already been written, the memory controller 12 reads or writes data as requested.

10 Claims, 9 Drawing Sheets

[Figure 1]
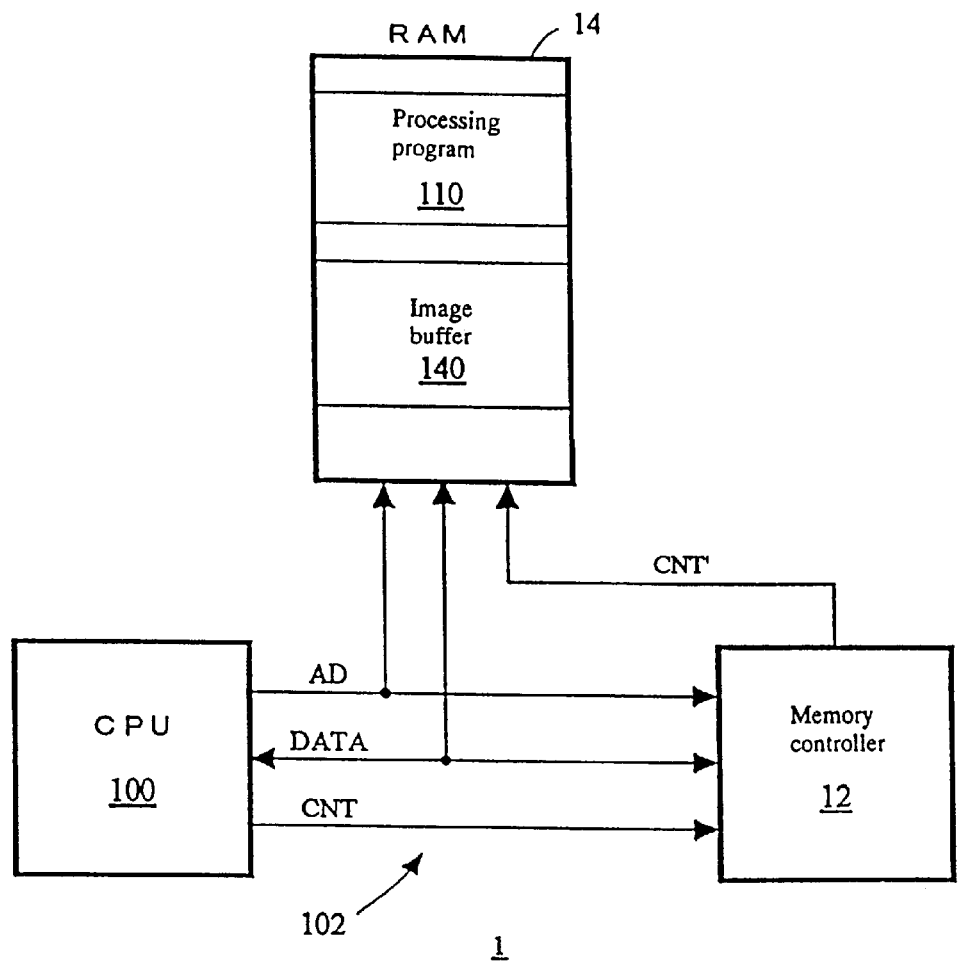

[Figure 2]
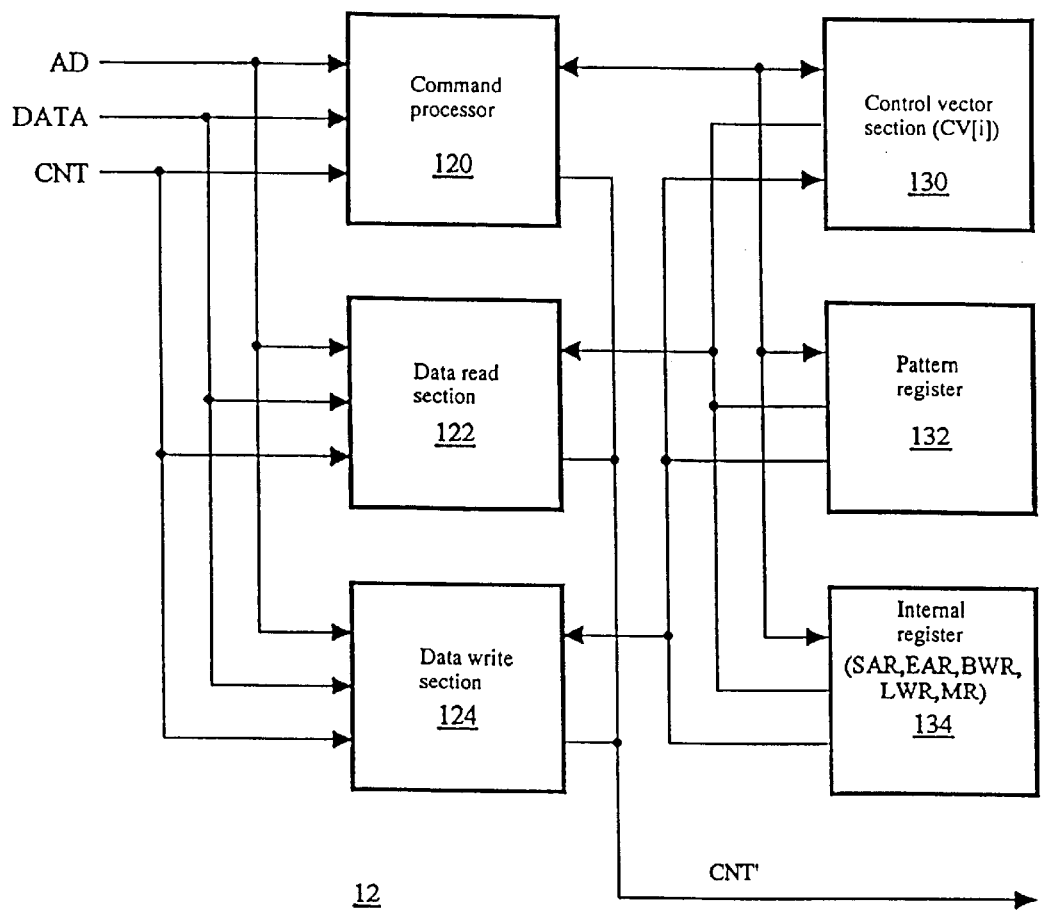

[Figure 3]
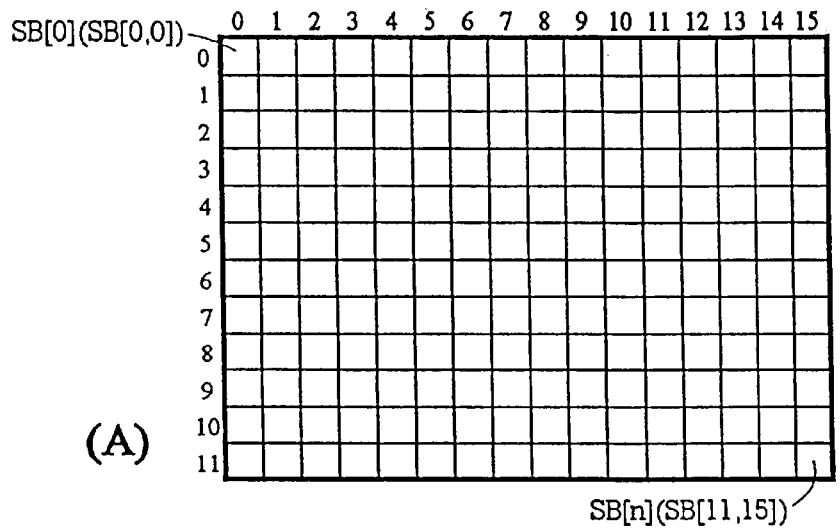
(A)
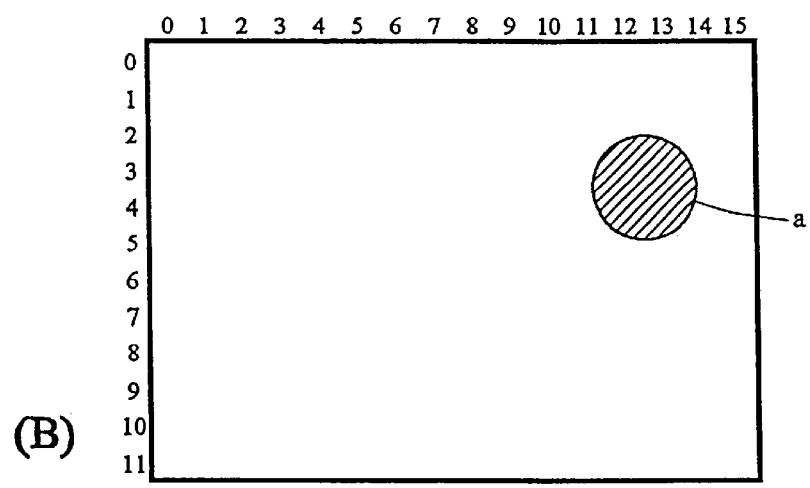
(B)
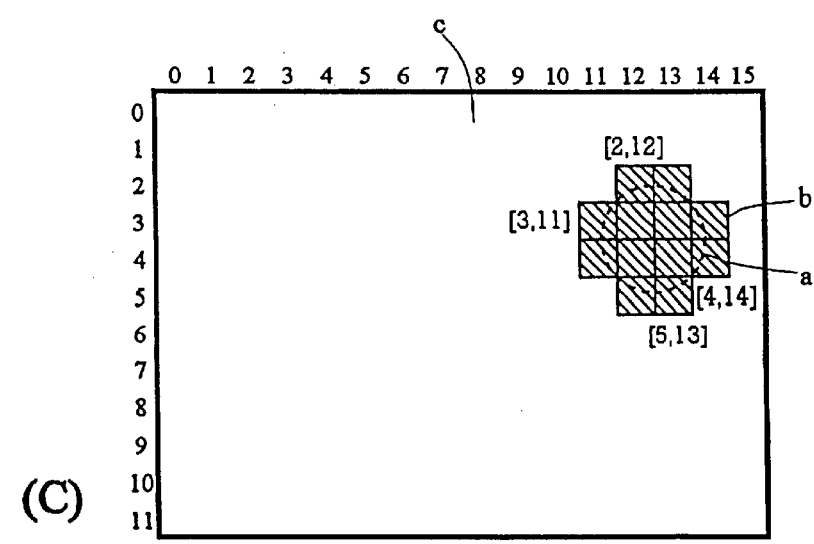
(C)

[Figure 4]
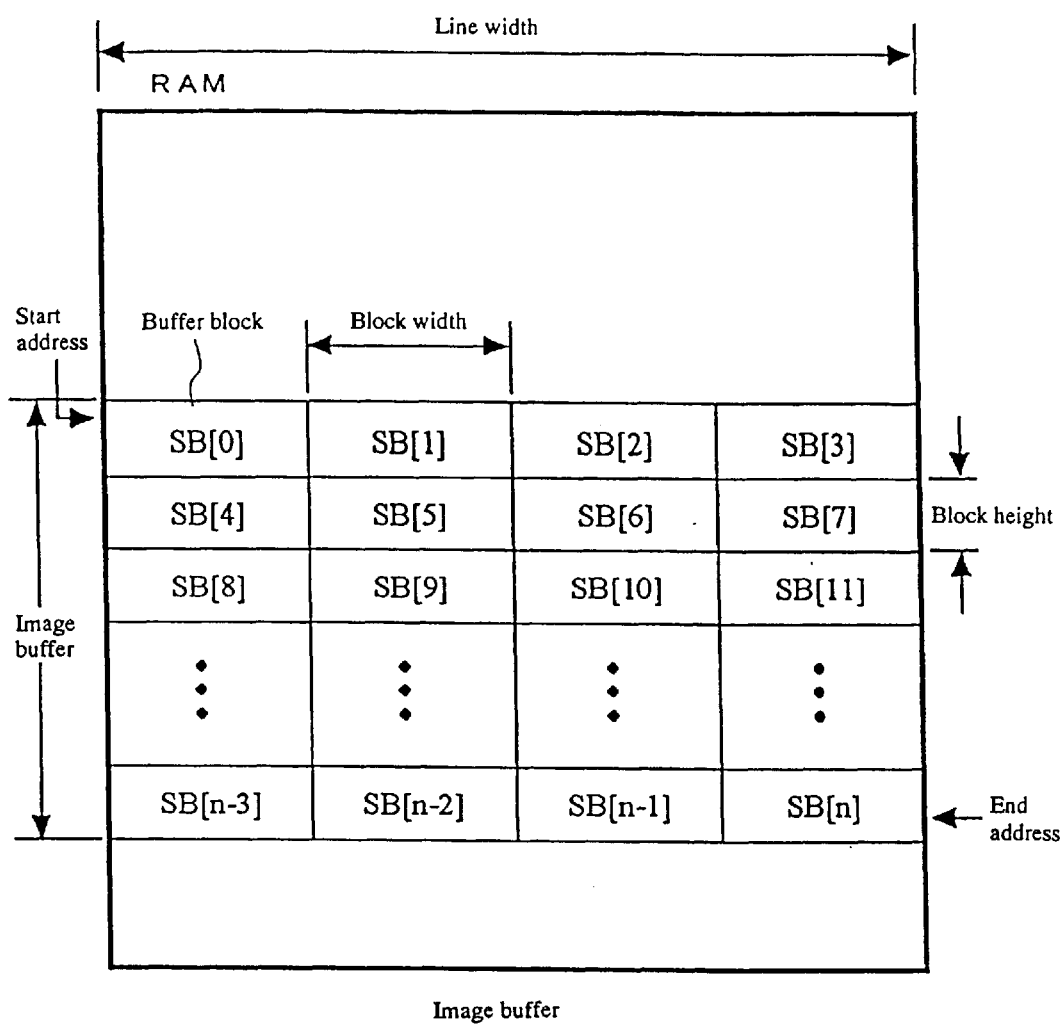
Image buffer
140

[Figure 5]
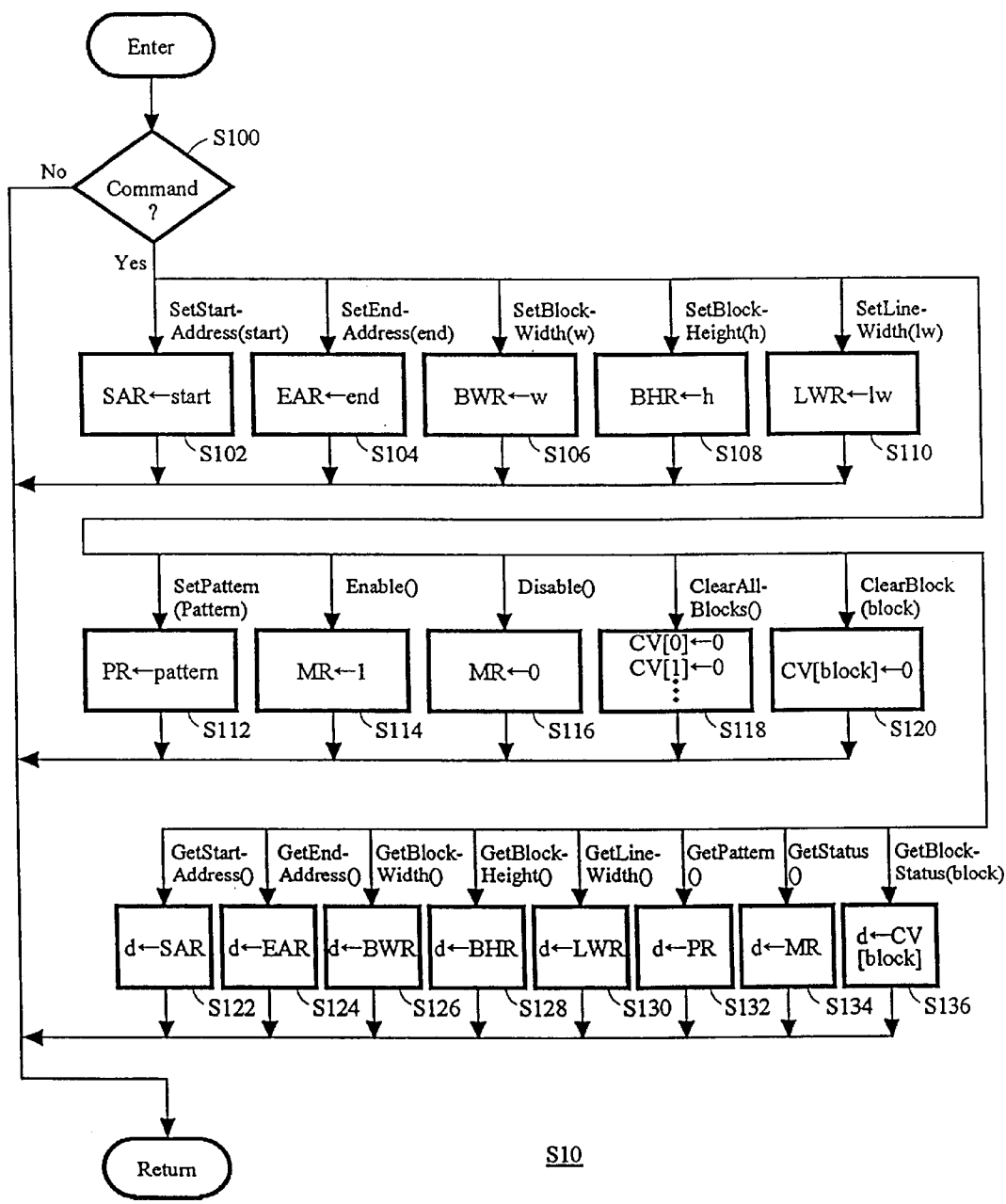

[Figure 6]
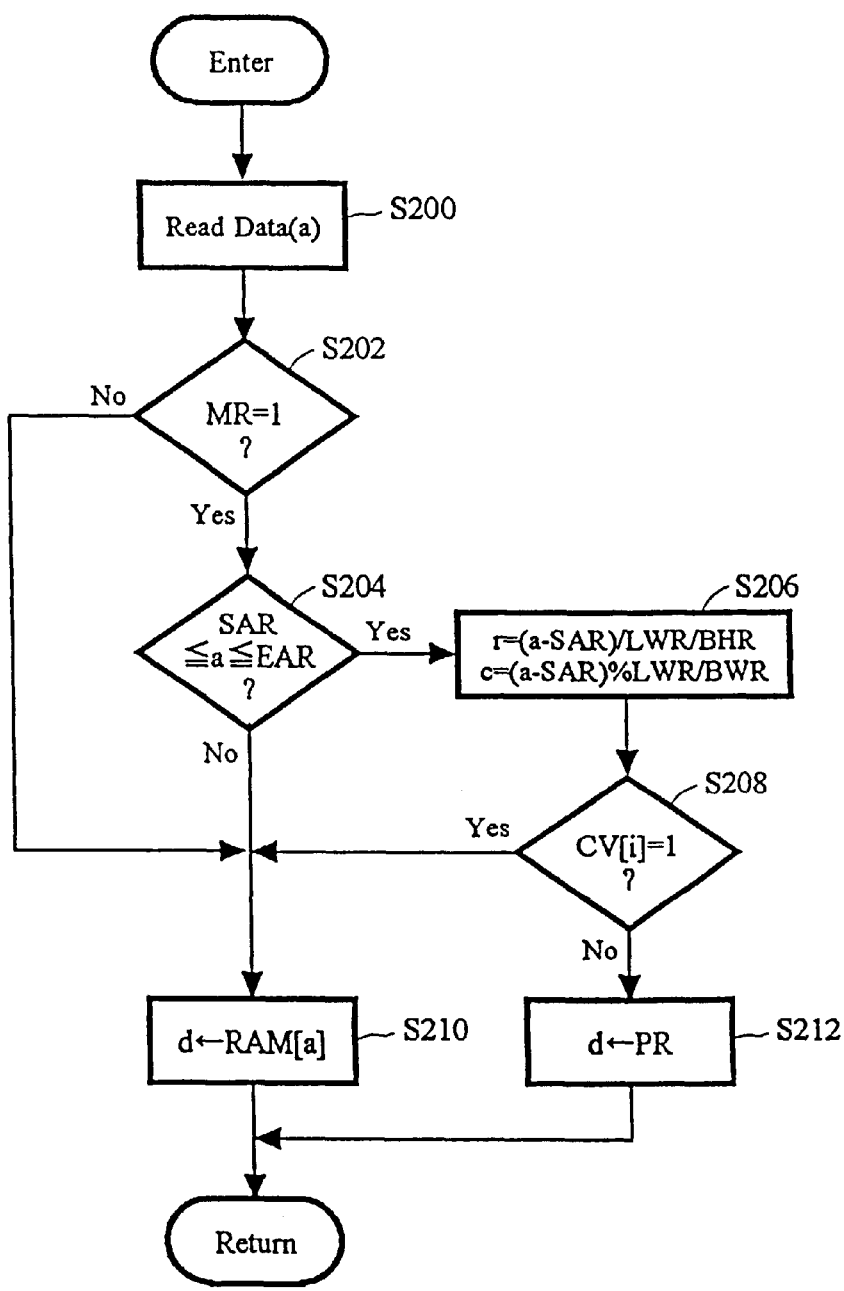

[Figure 7]
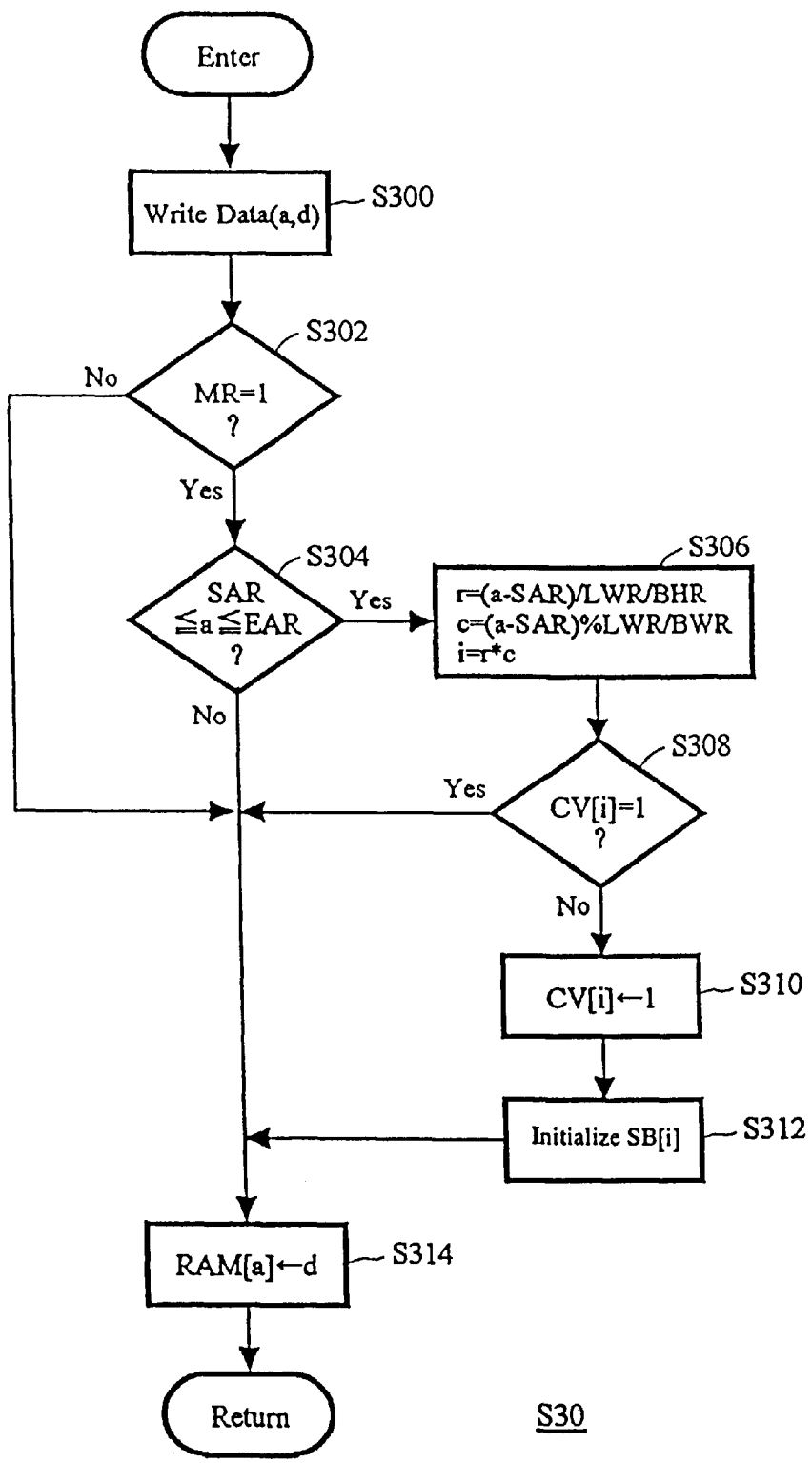

[Figure 8]
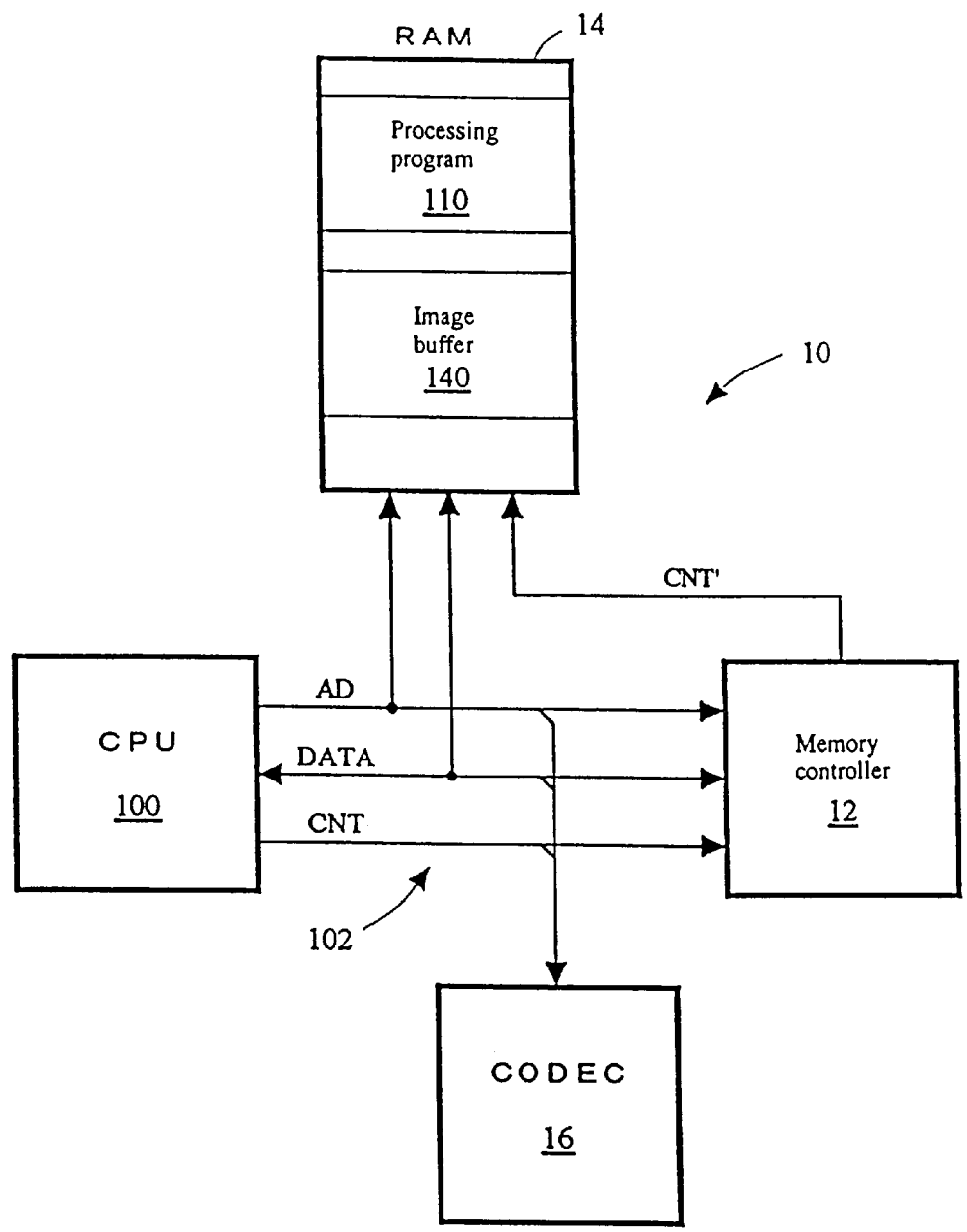

[Figure 9]
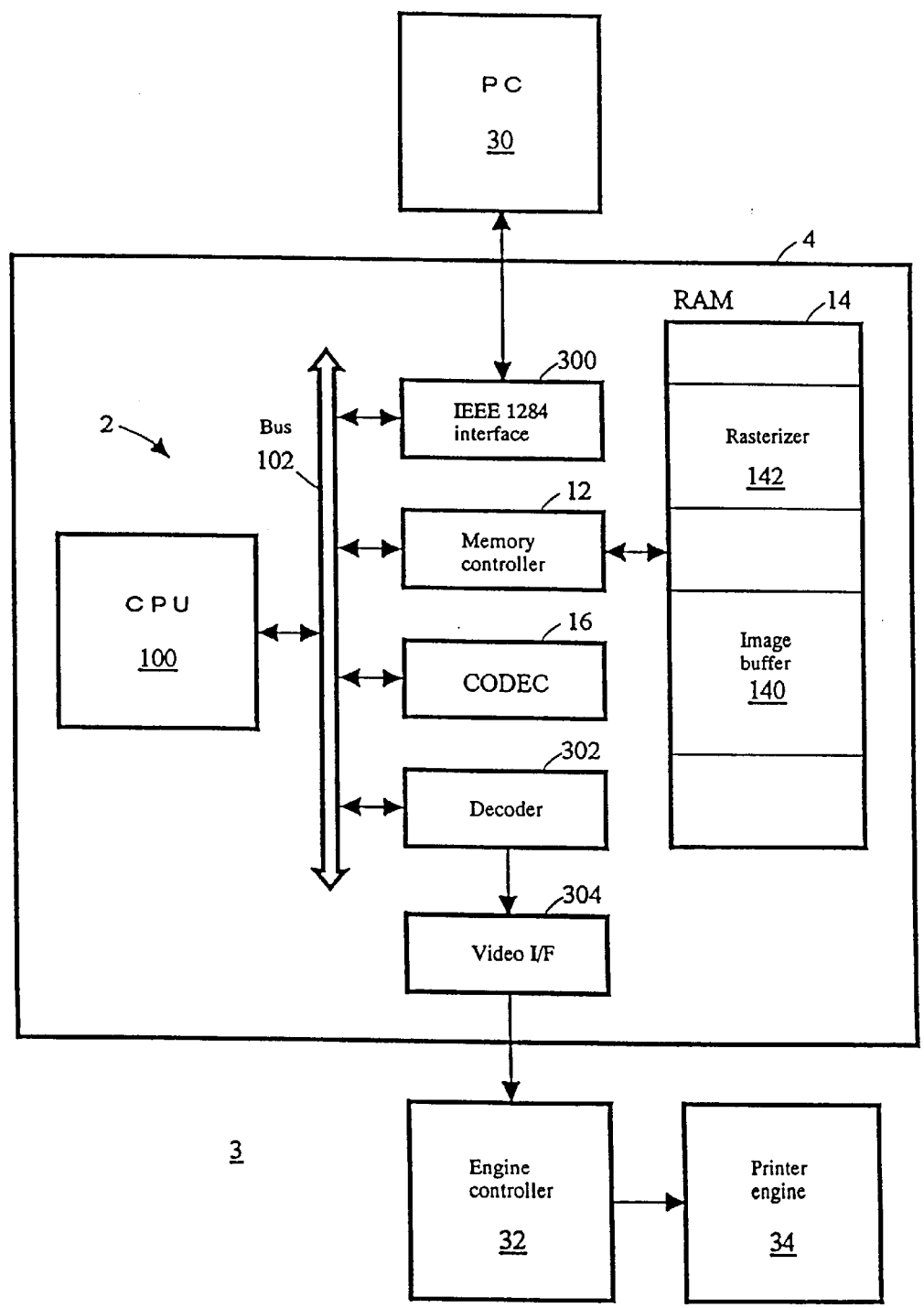

APPARATUS AND METHOD FOR MEMORY ACCESS CONTROL

BACKGROUND OF THE INVENTION

1. Field of the Invention

The present invention relates to a memory access control apparatus and method for reducing the frequency with which memory is accessed during printing.

2. Background of Related Art

An A-4 size black and white image data at 600 dpi occupies 4 MB of memory. A color image data having the same resolution and size as the black and white image data occupies 128 MB of memory, 32 times that of a black and white image. In a printer, data is read from and written to memory several times each time a sheet is printed.

For example, in order to perform read/write operations, a processor dedicated to image processing has been used, and an acceleration method, such as the use of separate CPU and image data busses, has been adopted.

These conventional acceleration methods increase manufacturing cost of printers.

In addition, for example, a printer printing 40 sheets of paper per minute, transfers and renderings 512 MB or more of data per 1.5 seconds (actually, transfer of several sets of 128-MB data). The conventional methods cannot cope with the transfer and rendering of such large volume of data.

In addition, cache memory may be used to accelerate processing of data by reducing the frequency with which memory is accessed. For example, Published Unexamined Patent Application No. 5-225059 and Published Unexamined Patent Application No. 4-100164 disclose management systems of cache memory.

However, since the structure of cache memory cannot usually be changed, the frequency with which memory is accessed may not be reduced if the structure of the cache memory is not suitable to the contents of processing of a program.

Further, if cache memory is used, it is not possible to completely omit accesses to areas where data has not been written.

Therefore, the need exists for a memory access control apparatus and method which reduces the frequency with which memory is accessed during read and write operations.

SUMMARY OF THE INVENTION

The present invention is performed in consideration of the problems of conventional technology described above. An object is to provide a memory access control apparatus and method for reducing the frequency with which memory is accessed in processing data, such as image printing and the like.

In addition, another object of the present invention is to provide a memory access control apparatus and method for reducing the frequency with which memory is accessed in image printing and the like, where conventional methods such as a method of using cache memory cannot achieve the objects.

Still another object of the present invention is to provide a memory access control apparatus and method for reducing the frequency with which memory is accessed, by omitting accesses to memory areas where data has not been written or modified.

In order to achieve the above objects, a first memory access control apparatus comprises: write management means for accepting the assignment of a plurality of blocks set in a storing area of memory where data can be read and written and managing whether data writing has already occurred or not to each of these blocks; and read access control means for accepting the setup of initializing data written in the plurality of blocks at first and sending back data written in any one of the plurality of blocks or the initializing data set in this block to an access source according to whether data writing has already occurred or not to this block when a read access occurs to this block.

Preferably, in the read access control means, the initializing data is commonly set to the plurality of blocks.

Still preferably, when a read access occurs to any one of the plurality of blocks, the read access control means sends back data to an access source after reading the data from this block if the data has already been written in this block, and if not, the read access control means sends back the initializing data, set to this block, to the access source.

A second memory access control apparatus comprises: a write management means for accepting the assignment of a plurality of blocks set in a storing area of memory where data can be read and written and managing whether data has already been written in each of these blocks; and write access control means for accepting the setup of initializing data written in the plurality of blocks for the first time and writing the initializing data, which is set, and data to be written with a write access in any one of the plurality of blocks, or the data, which is to be written, in this block according to whether data has already been written in this block when the write access occurs to this block.

Further preferably, in the write access control means, the initializing data is commonly set to the plurality of blocks.

Still further preferably, the write access control means writes data in any one of the plurality of blocks if the data has already been written in this block when a write access occurs to this block, and if not, the write access control means writes the initializing data in this block, and writes data making this block in such a state that the data to be written is written.

A memory access control apparatus according to the present invention is suitable to acceleration of image processing, a large part of the background data is filled with the same contents, is processed, as cases of generating computer graphic scenes and printing an office document with a printer.

The memory access control apparatus according to the present invention uses a memory area storing image data with dividing the area in a plurality of blocks corresponding to respective background graphics according to the setup by a image processing program, and accepts from the image processing program the setup of background image data to be stored in respective blocks (initializing data).

The memory access control apparatus according to the present invention writes background image data (initializing data) in a block for the first time if a image processing program performs the first write access to this block, and further writes the data that the image processing program is going to write.

Hereafter, the memory access control apparatus according to the present invention does not write the initializing data if a further write access occurs to a block where the write access has already been performed, but writes only the data that the image processing program is going to write.

In addition, the memory access control apparatus according to the present invention sends back the initializing data to the image processing program instead of sending back to the image processing program the data that is read from a block if the write access has not occurred to this block and only the read access occurs.

In this manner, by sending back the initializing data without actually writing image data in the memory, which is a part becoming a background, until the write access occurs, the memory access control apparatus according to the present invention omits a memory access by omitting write processing of the initializing data (background data) in a block to which a write access is not performed.

The write management means has, for example, a management table storing data with corresponding to respective blocks obtained by dividing a storing area of memory, and manages whether a write access has not occurred at all to each of these blocks or one or more write accesses have occurred.

The read access control means accepts the setup of, for example, background image data as the initializing data, and refers to the management table when a read access occurs to a block. Further, the read access control means sends back the initializing data, which is set, to a program and the like performing the read access if the data in the table that corresponds to a block to which the read access is performed shows that the write access has not occurred at all to this block.

In addition, if the data in the table that corresponds to a block to which the read access is performed shows that one or more write accesses have occurred to this block, the read access control means sends back data, which is actually read from the block to which the read access is performed, to a program and the like performing the read access.

Similarly, the write access control means accepts the setup of, for example, background image data as the initializing data, and refers to the management table when a write access occurs to a block. In addition, the write access control means writes the initializing data, which is set, in this block if the data in the table that corresponds to a block to which the write access is performed shows that the write access has not occurred at all to this block. Further, the write access control means writes in this block the data to be written with the write access.

In addition, if the data in the table that corresponds to a block to which the write access is performed shows that one or more write accesses have occurred to this block, the write access control means merely writes in this block the data to be written.

In addition, a first memory access control method according to the present invention accepts the assignment of a plurality of blocks set in a storing area of memory where data can be read and written, manages whether data has already been written in each of these blocks, and accepts the setup of the initializing data that is first written in the plurality of blocks. Further, when a read access occurs to any one of the plurality of blocks, the first memory access control method sends back the data, which is written in this block, or the initializing data, which is set to this block, to an access source according to whether data has already been written in this block.

In addition, a second memory access control method according to the present invention accepts the assignment of a plurality of blocks set in a storing area of memory where data can be read and written, manages whether data has already been written in each of these blocks, and accepts the setup of the initializing data that is first written in the plurality of blocks. Further, when a write access occurs to any one of the plurality of blocks, the second memory access control method writes the initializing data, which is set, and data, which is to be written in this block with the write access, or the data, which is to be written, in this block according to whether data writing has already occurred or not to this block.

According to another embodiment of the present invention, a memory controller is provided for generating a control signal for read and write that controls an operation of a random access memory (RAM) according to a command issued by a central processing unit (CPU). The memory controller includes: a control vector section for storing Control vectors, the control vectors indicate which buffer blocks, of an image buffer, contain data; a pattern register for storing an initializing data set to the buffer blocks of the image buffer in the RAM; an internal register for storing a setup of respective parameters of the image buffer; and a command processor for reading data stored in the control vector section, pattern register section and internal register section, and informing the CPU of the data. The memory controller enables the CPU to perform an image processing operation which initializes the portion of the image buffer in RAM containing data as indicated by the control vector section. The internal register of the memory controller, stores parameters including: a start address of the image buffer; an end address of the image buffer; a block width of the buffer blocks; a line width of the RAM; and a flag for indicating whether the memory controller is operable.

These and other objects, features, and advantages of the present invention will become apparent from the following detailed description of illustrative embodiments thereof, which is to be used in connection with the accompanying drawings.

BRIEF DESCRIPTION OF THE DRAWINGS

The preferred embodiments are described with reference to the drawings wherein:

FIG. 1 is a block diagram showing the structure of a image data processing apparatus according to the present invention;

FIG. 2 is a block diagram showing the structure of a memory controller shown in FIG. 1;

FIG. 3(A) is a diagram illustrating a method for dividing image data; FIG. 3(B) is a diagram illustrating a graphic image that a CPU (processing program) shown in FIG. 1 is going to write in RAM; FIG. 3(C) is a diagram showing blocks where the graphic image shown in FIG. 3(B) is written;

FIG. 4 is a diagram illustrating the structure of buffer blocks included in the image buffer shown in FIG. 1;

FIG. 5 is a flow chart showing the processing (S10) of a command processor shown in FIG. 2;

FIG. 6 is a flow chart showing the processing (S20) of a data read section shown in FIG. 2;

FIG. 7 is a flow chart showing the processing (S30) of a data write section shown in FIG. 2;

FIG. 8 is a block diagram showing the structure of a image codec that is shown as an application example of the image data processing apparatus shown in FIG. 1 and the like; and FIG. 9 is a block diagram showing the structure of a printer controller that is shown as an application example of the image codec shown in FIG. 8.

DETAILED DESCRIPTION OF PREFERRED EMBODIMENTS

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the concept of the invention to those skilled in the art.

FIG. 1 is a block diagram showing the structure of a image data processing apparatus 1 according to the present invention. As shown in FIG. 1, the image data processing apparatus 1 comprises a CPU 100, a memory controller 12, and RAM 14, which are connected via a bus 102.

In addition, the bus 102 includes the address bus (AD), a data bus (DATA), and a control bus (CNT), and the CPU 100 and memory controller 12 are connected via these three types of buses.

Address information is outputted via the address bus (AD) from the CPU 100 to the memory controller 12 and RAM 14, and data is transmitted and received via the data bus (DATA) between these components.

A control signal is outputted via the control bus (CNT) from the CPU 100 to the memory controller 12, and is outputted via the memory controller 12 to the RAM 14 as a control signal (CNT').

The CPU 100 is, for example, a general purpose microprocessor, or a digital signal processor (DSP), executes a image data processing program (processing program 110) stored in the RAM 14, and processes image data stored in an area of the image buffer 140 in the RAM 14.

FIG. 2 is a block diagram showing the structure of the memory controller 12 shown in FIG. 1. As shown in FIG. 2, the memory controller 12 comprises a command processor 120, a data read section 122, a data write section 124, a control vector section 130, a pattern register 132, and an internal register 134.

A preferred embodiment of the memory controller 12 will now be described in detail. The memory controller 12 enables the CPU 100 (processing program 110) to perform image processing without initialization to the RAM 14 (image buffer 140) owing to these components.

The memory controller 12 generates the control signal (CNT') for read and write that controls the operation of the RAM 14 according to a command issued by the CPU 100 (processing program 110), and outputs the control signal to the RAM 14.

FIG. 3(A) is a diagram illustrating a method for dividing image data, FIG. 3(B) is a diagram illustrating a graphic image that the CPU 100 (processing program 110) shown in FIG. 1 is going to write in the RAM 14, and FIG. 3(C) is a diagram showing blocks where the graphic image shown in FIG. 3(B) is written.

FIG. 4 is a diagram illustrating the structure of buffer blocks included in the image buffer 140 shown in FIG. 1.

A preferred embodiment of the method for dividing image data will now be described with respect to FIG. 3(A). The frame of an image is divided into 16×12 (=192) pieces or are graphic blocks. A data block (initializing data) that has one word of data is initially set to each of these graphic blocks so that the blocks have the same content. The data block is generally called wall paper.

The memory controller 12 accepts the setup by the processing program 110 executed by the CPU 100, and generates in the RAM 14 the image buffer 140, including 192 buffer blocks SB[0] to SB[n] (n=192, hereinafter, if not specified, one word of data is stored in one buffer block as described in FIG. 4) storing respective image data in 192 graphic blocks SB[0, 0] to SB[11, 15] as shown in FIG. 3(A). In addition, the memory controller 12 accepts the setup of the initializing data that is initially set to each of these blocks.

Further, the memory controller 12 manages whether the CPU 100 (processing program 110) has written image data in each of the plurality of blocks.

In addition, as shown in FIG. 4, an area of this image buffer and block split thereof are defined by respective parameters: a start address of the image buffer area; an end address of the image buffer area; line width showing data width in the RAM 14; block width showing data width of each buffer block; and block height showing the number of lines of each buffer block.

The memory controller 12 performs the following two types of access management. In the first type, when the CPU 100 (processing program 110; FIG. 1) reads image data from a buffer block where image data has not been written (FIG. 4), the memory controller 12 sends back the initializing data, which is set, to the CPU 100 (processing program 110) without reading the image data from the image buffer 140 in the RAM 14. When the CPU 100 (processing program 110) writes image data for the first time in a buffer block where image data has not been written, the memory controller 12 not only stores and manages the fact that image data has been written in this block, but also, first writes the initializing data in this buffer block, and further writes the image data, which the CPU 100 (processing program 110) is going to write, in this buffer block.

In the second type of access management, when the CPU 100 (processing program 110) writes image data in a buffer block where image data has already been written (FIG. 4), the memory controller 12 writes in this buffer block the image data, as it is, that the CPU 100 (processing program 110) is going to write. In addition, when the CPU 100 (processing program 110) reads image data from a block where image data has already been written, the memory controller 12 reads the image data from this block, and outputs the image data to the CPU 100 (processing program 110).

In the memory controller 12 (FIGS. 1 and 2), the control vector section 130 accepts and holds the setup of a control vector CV[i] ($0 \leq i \leq n$) corresponding to each of buffer blocks SB[0] to SB[n] (FIG. 4; where, n=191 in this embodiment) of the image buffer 140 in the RAM 14.

The control vector CV[i] stored in the control vector section 130 has a value of 1 (this means that image data has already been written in a buffer block SB[i] of the image buffer 140) or 0 (this shows that image data has not been written in the buffer block SB[i] of the image buffer 140). Further, the control vector CV[i] is used for access control to each buffer block of the image buffer 140 (FIG. 4) described above.

The pattern register 132 (this is also expressed as PR) accepts and holds the initializing data set to each buffer block of the image buffer 140 in the RAM 14.

The method of setting common initializing data to all the buffer blocks of the image buffer 140 will now be described in detail. The internal register 134 includes a plurality of registers (SAR, EAR, BWR, LWR, and MR) internally, and accepts and holds the setup of respective parameters of the image buffer 140 that are described above. In addition, the register SAR (Start Address Register) among these registers holds the start address of the image buffer 140 (FIG. 4). In addition, the register EAR (End Address Register) holds the end address of the image buffer 140 (FIG. 4). Further, the register BWR (Block Width Register) holds the block width of each buffer block SB[i] of the image buffer 140 (FIG. 4). Further, the register LWR (Line Width Register) holds the line width of the RAM 14 (FIG. 4). Still further, the register MR (Mode Register) holds a flag showing whether the memory controller 12 is operable (1 means to be operable, and 0 means to be not operable).

The command processor 120 (FIG. 2) accepts the initializing data, and setup such as the setup of an area of the image buffer 140 and block split thereof according to a command input from the CPU 100 (processing program 110), and sets the setup to the control vector section 130, pattern register 132, and internal register 134. In addition, the command processor 120 reads data, which the control vector section 130, pattern register 132, and internal register 134 hold, according to a command from the CPU 100 (processing program 110), and informs the CPU 100 (processing program 110) of the data. Further, the command processor 120 enables or disables the memory controller 12 to operate, according to a command from the CPU 100 (processing program 110).

The details of processing of the command processor 120 will now be described. First, a list of commands issued from the CPU 100 (processing program 110) to the command processor 120 will be listed in the following table described below.

(Table 1) List of Commands to Command Processor 120:
(1) SetStartAddress (start):
   To make a start address (FIG. 4) accepted
(2) SetEndAddress (end):
   To make an end address (FIG. 4) accepted
(3) SetBlockWidth (w):
   To make block width (FIG. 4) accepted
(4) SetBlockHeight (h):
   To make block height (FIG. 4) accepted
(5) SetLineWidth (lw):
   To make line width (FIG. 4) accepted
(6) SetPattern (Pattern):
   To make initializing data (pattern) accepted
(7) Enable:
   To enable a memory controller 12 to operate
(8) Disable:
   To disable the memory controller 12 to operate
(9) ClearAllBlocks:
   To make all the contents of a control vector section 130 zero-cleared
(10) ClearBlock (block):
   To make contents of a block assigned by the control vector section 130 zero-cleared
(11) GetStartAddress:
   To inquire the start address (FIG. 4)
(12) GetEndAddress:
   To inquire the end address (FIG. 4)
(13) GetBlockWidth:
   To inquire the block width (FIG. 4)
(14) GetBlockHeight:
   To inquire the block height (FIG. 4)
(15) GetLinewidth:
   To inquire the line width (FIG. 4)
(16) GetPattern:
   To inquire the initializing data (Pattern)
(17) GetStatus:
   To inquire whether a memory controller 12 is enabled
(18) GetBlockStatus (block):
   To inquire contents of a block assigned by the control vector section 130

The commands shown in Table 1 (including memory mapped IO commands, IO commands, or the like) are issued from the CPU 100 (processing program 110) to the memory controller 12 via the bus 102, and these commands are used for the following purposes:
(1) SetStartAddress (start): This is used for such a purpose that the CPU 100 (processing program 110) makes the command processor 120 accept a start address (FIG. 4);
(2) SetEndAddress (end): This is used for such a purpose that the processing program 110 makes the command processor 120 accept an end address (FIG. 4).
(3) SetBlockWidth (w): This is used for such a purpose that the processing program 110 makes the command processor 120 accept block width (FIG. 4).
(4) SetBlockHeight (h): This is used for such a purpose that the processing program 110 makes the command processor 120 accept block height (FIG. 4).
(5) SetLineWidth (lw): This is used for such a purpose that the processing program 110 makes the command processor 120 accept line width (FIG. 4).
(6) SetPattern (Pattern): This is used for such a purpose that the processing program 110 makes the command processor 120 accept initializing data (pattern).
(7) Enable: This is used for such a purpose that the processing program 110 enables the memory controller 12 to operate.
(8) Disable: This is used for such a purpose that the processing program 110 disables the memory controller 12 to operate.
(9) ClearAllBlocks: This is used for such a purpose that the processing program 110 makes the command processor 120 zero-clear all the contents of the control vector section 130.
(10) ClearBlock (block): This is used for such a purpose that the processing program 110 makes the command processor 120 zero-clear contents of a block assigned by the control vector section 130.
(11) GetStartAddress: This is used for such a purpose that the processing program 110 inquires the start address (FIG. 4) of the command processor 120.
(12) GetEndAddress: This is used for such a purpose that the processing program 110 inquires the end address (FIG. 4) of the command processor 120.
(13) GetBlockWidth: This is used for such a purpose that the processing program 110 inquires the block width (FIG. 4) of the command processor 120.
(14) GetBlockHeight: This is used for such a purpose that the processing program 110 inquires the block height (FIG. 4) of the command processor 120.
(15) GetLinewidth: This is used for such a purpose that the processing program 110 inquires the line width (FIG. 4) of the command processor 120.
(16) GetPattern: This is used for such a purpose that the processing program 110 inquires the initializing data (pattern) of the command processor 120.
(17) GetStatus: This is used for such a purpose that the processing program 110 inquires of the command processor 120 whether the memory controller 12 is enabled.
(18) GetBlockStatus (block): This is used for such a purpose that the processing program 110 inquires contents of a block, assigned by the control vector section 130, of the command processor 120.

These will be described in further detail with reference to FIG. 5. FIG. 5 is a flow chart showing the processing (S10)

of the command processor 120 shown in FIG. 2. As shown in FIG. 5, at step 100 (S100), the command processor 120 analyzes data input from the CPU 100 (processing program 110) via the bus 102, and judges which of commands listed in Table 1 the data input is. If the data input is not a command, the process is terminated, and if not, the process goes to any one of steps S102 to S136 according to a kind of the command input.

In addition, in FIG. 5, symbol d shows a register d, which is provided in the internal register 134, or a storing area (not shown), which is provided in the RAM 14, for temporarily holding data.

For example, corresponding to the command "GetStartAddress (item (11))" listed in Table 1, the command processor 120 is required to return data, held in a register SAR of the internal register 134, to the CPU 100 (processing program 110). Nevertheless, in this case, the command processor 120 does not return the data, read from the register, directly to the CPU 100 (processing program 110), but sends back the data through the storing area d to the CPU 100 (processing program 110).

Further, in the following respective drawings, mere "Return" shows the termination of processing, and "Return (d)" shows such processing that is described above.

If the command input is "SetStartAddress (start; item (1) in Table 1)" that is used for such a purpose that the CPU 100 (processing program 110) makes the command processor 120 accept a start address (FIG. 4), at step 102 (S102) the command processor 120 sets a start address (start), which is input from the CPU 100 (processing program 110) via the data bus (DATA) in parallel with this command, to the register SAR of the internal register 134.

If the command input is "SetEndAddress (end; item (2) in Table 1)" that is used for such a purpose that the CPU 100 (processing program 110) makes the command processor 120 accept an end address (FIG. 4), at step 104 (S104) the command processor 120 sets an end address (end), which is input from the CPU 100 (processing program 110) via the data bus (DATA) in parallel with this command, to a register EAR of the internal register 134.

If the command input is "SetBlockWidth (w; item (3) in Table 1)" that is used for such a purpose that the CPU 100 (processing program 110) makes the command processor 120 accept block width (FIG. 4), at step 106 (S106) the command processor 120 sets block width (w), which is input from the CPU 100 (processing program 110) via the data bus (DATA) in parallel with this command, to a register BWR of the internal register 134.

If the command input is "SetBlockHeight (h; item (4) in Table 1)" that is used for such a purpose that the CPU 100 (processing program 110) makes the command processor 120 accept block height (FIG. 4), at step 108 (S108) the command processor 120 sets block height (h), which is input from the CPU 100 (processing program 110) via the data bus (DATA) in parallel with this command, to the register BHR of the internal register 134.

If the command input is "SetLineWidth (lw; item (5) in Table 1)" that is used for such a purpose that the CPU 100 (processing program 110) makes the command processor 120 accept line width (FIG. 4), at step 110 (S110) the command processor 120 sets line width (lw), which is input from the CPU 100 (processing program 110) via the data bus (DATA) in parallel with this command, to the register LWR of the internal register 134.

If the command input is "SetPattern (Pattern; item (6) in Table 1)" that is used for such a purpose that the CPU 100 (processing program 110) makes the command processor 120 accept initializing data, at step 112 (S112) the command processor 120 sets initializing data (pattern), which is input from the CPU 100 (processing program 110) via the data bus (DATA) in parallel with this command, to the internal register 134.

If the command input is "Enable (item (7) in Table 1)" that is used for such a purpose that the CPU 100 (processing program 110) enables the memory controller 12 to operate, at step 114 (S114) the command processor 120 sets a value, 1 to a register MR of the internal register 134, and enables the memory controller 12 to operate.

If the command input is "Disable (item (8) in Table 1)" that is used for such a purpose that the CPU 100 (processing program 110) disables the memory controller 12 to operate, at step 116 (S116) the command processor 120 sets a value, 0 to a register MR of the internal register 134, and disables the memory controller 12 to operate.

If the command input is "ClearAllBlocks (item (9) in Table 1)" that is used for such a purpose that the CPU 100 (processing program 110) makes all the contents of control vectors in the control vector section 130 zero-cleared, at step 118 (S118) the command processor 120 sets values of all the control vectors CV[0] to CV[n] in the control vector section 130 to zero.

If the command input is "ClearBlock (block; item (10) in Table 1)" that is used for such a purpose that the CPU 100 (processing program 110) makes any one assigned from among the control vectors in the control vector section 130 zero-cleared, at step 120 (S120) the command processor 120 sets a value of a control vector CV[block] in the control vector section 130, which is assigned by data (block) which is input from the CPU 100 (processing program 110) via the data bus (DATA) in parallel with this command, to zero.

If the command input is "GetStartAddress (item (11) in Table 1)" that is used for such a purpose that the CPU 100 (processing program 110) inquires the start address set in the register SAR of the internal register 134, at step 122 (S122) the command processor 120 reads the start address set in the register SAR of the internal register 134, and outputs the start address to the CPU 100 (processing program 110) via the data bus (DATA) (d←SAR)

If the command input is "GetEndAddress (item (12) in Table 1)" that is used for such a purpose that the CPU 100 (processing program 110) inquires the end address (FIG. 4) set in the register EAR of the internal register 134, at step 124 (S124) the command processor 120 reads the end address set in the register EAR of the internal register 134, and outputs the end address to the CPU 100 (processing program 110) via the data bus (DATA) (d←EAR).

If the command input is "GetBlockWidth (item (13) in Table 1)" that is used for such a purpose that the CPU 100 (processing program 110) inquires the block width (FIG. 4) set in the register BWR of the internal register 134, at step 126 (S126) the command processor 120 reads the block width set in the register BWR of the internal register 134, and outputs the block width to the CPU 100 (processing program 110) via the data bus (DATA) (d←BWR).

If the command input is "GetBlockHeight (item (14) in Table 1)" that is used for such a purpose that the CPU 100 (processing program 110) inquires the block height (FIG. 4) set in the register BHR of the internal register 134, at step 128 (S128) the command processor 120 reads the block height set in the register BHR of the internal register 134, and outputs the block height to the CPU 100 (processing program 110) via the data bus (DATA) (d←BHR).

If the command input is "GetLineWidth (item (15) in Table 1)" that is used for such a purpose that the CPU 100

(processing program 110) inquires the line width (FIG. 4) set in the register LWR of the internal register 134, at step 130 (S130) the command processor 120 reads the line width set in the register LWR of the internal register 134, and outputs the line width to the CPU 100 (processing program 110) via the data bus (DATA) (d←LWR)

If the command input is "GetPattern (item (16) in Table 1)" that is used for such a purpose that the CPU 100 (processing program 110) inquires the initializing data set in the pattern register 132 (PR), at step 132 (S132) the command processor 120 reads the initializing data (pattern) set in the pattern register 132, and outputs the initializing data to the CPU 100 (processing program 110) via the data bus (DATA) (d←PR).

If the command input is "GetStatus (item (17) in Table 1)" that is used for such a purpose that the CPU 100 (processing program 110) inquires contents of the register MR of the internal register 134, at step 134 (S134) the command processor 120 reads a value (status) set in the register MR of the internal register 134, and outputs the value to the CPU 100 (processing program 110) via the data bus (DATA) (d←MR).

If the command input is "GetBlockStatus (item (18) in Table 1)" that is used for such a purpose that the CPU 100 (processing program 110) inquires contents of a block that is assigned from among the control vectors held by the control vector section 130, at step 136 (S136) the command processor 120 reads a value of a control vector CV[block] that is assigned in the data (block) input from the CPU 100 (processing program 110) via the data bus (DATA) in parallel with this command, and outputs the value to the CPU 100 (processing program 110) via the data bus (DATA) (d←CV[block]).

The data read section 122 reads the initializing data from the pattern register 132 (FIG. 2) according to a command used by the CPU 100 (processing program 110) for reading data in the RAM 14, and sends back the initializing data to the CPU 100 (processing program 110). Alternatively, the data read section 122 reads data from an address of the RAM 14 that is assigned by the CPU 100 (processing program 110) via the address bus (AD), and sends back the data to the CPU 100 (processing program 110).

Thus, the data read section 122 performs access management at the time when the CPU 100 (processing program 110) reads data from the RAM 14, among access management described above.

The processing of the data read section 122 will be described in further detail with reference to FIG. 6.

FIG. 6 is a flow chart showing the processing (S20) of the data read section 122 shown in FIG. 2. As shown in FIG. 6, at step 200 (S200) the CPU 100 (processing program 110) assigns an address "a" via the address bus (AD), and issues the command ReadData (a) for reading a word of data from the RAM 14, to the data read section 122 via the bus 102.

At step 202 (S202), the data read section 122 reads data from the register MR of the internal register 134, and judges whether the value set in the register MR is 1.

If the value set in the register MR is 1 (thus, the memory controller 12 is enabled), the process in the data read section 122 goes to step 204, and if not, the process goes to step 210.

At step 204 (S204), the data read section 122 judges whether the address "a" assigned by the CPU 100 (processing program 110) at step 200 is between the start address and end address set in the registers SAR and EAR of the internal register 134 (FIG. 4) respectively.

If the address "a" is between the start address and the end address, that is, if the address "a" is within the range of the image buffer 140, the process goes to step 206, and if not, the process goes to step 210.

At step 206 (S206), the data read section 122 calculates a result r that is obtained by dividing a value, obtained by subtracting the start address (contents of the register SAR) from the address "a," by the line width (FIG. 4) and block height (thus, r=(a−SAR)/LWR/BHR; where X/Y shows the integer-division of X by Y).

In addition, the data read section 122 calculates a value c that is obtained by integer-dividing a remainder, obtained by integer-dividing a value (a−SAR), obtained by subtracting the start address (contents of the register SAR) from the address "a," by the line width (FIG. 4), by the block width (thus, c=(a−SAR)%LWR/BWR; where X%Y shows a remainder of X obtained by the division of X by Y).

Further, the data read section 122 obtains a multiplication result i by multiplication of the calculation results r and c (thus, i=r×c).

In addition, this multiplication result i shows which buffer block SB[i] in the image buffer 140 (FIG. 4) includes the address "a."

At step 208 (S208), the data read section 122 reads a control vector CV[i], corresponding to the buffer block SB[i] in the image buffer 140 that is shown by the multiplication result i obtained at step 206, from the control vector section 130. Further, the data read section 122 judges whether a value of the control vector CV[i] is 1.

If the value of the control vector CV[i] is 1, the process in the data read section 122 goes to step 210, and if not, the process goes to step 212.

At step 210 (S210), the data read section 122 generates the control signal (CNT') that makes the RAM 14 return the data, which is stored in an address that is input from the CPU 100 (processing program 110) via the address bus (AD; FIG. 1), to the CPU 100 (processing program 110).

According to this control signal (CNT'), the RAM 14 outputs the data stored in the address, which is assigned, to the CPU 100 (processing program 110) via the data bus (DATA; FIG. 1) (d←RAM[a]).

Thus, the data read section 122 controls the RAM 14 so that the RAM 14 may actually read a word of data from the address "a" and may output the data to the CPU 100 (processing program 110).

At step 212 (S212), the data read section 122 calculates which address of the pattern register 132 (PR) storing the initializing data corresponds to the address "a." Further, the data read section 122 reads a word of data from the address of the pattern register 132 that is obtained as a calculation result, and outputs the data to the CPU 100 (processing program 110) via the data bus (DATA) (d←PR).

The data write section 124 performs access management, relating to data write in the RAM 14 among the access management described above, on the basis of a command and the address "a," which are used by the CPU 100 (processing program 110) for writing data in the RAM 14, and the value of the control vector CV[i] corresponding to the address "a."

Thus, if the value of the control vector CV[i] of the buffer block (FIG. 4) corresponding to the address "a" assigned by the CPU 100 (processing program 110) is zero (this shows that data has not been written in this block), the data write section 124 reads the initializing data from the pattern register 132 (FIG. 2). Further, the data write section 124 initializes this buffer block by writing the initializing data in the block including the address "a," and controls the RAM 14 so that the RAM 14 may write in the address "a" the data that the CPU 100 (processing program 110) is going to write.

On the contrary, if the value of the control vector CV[i] of the buffer block (FIG. 4) corresponding to the address "a" assigned by the CPU 100 (processing program 110) is one (this shows that data has already been written in this block), the data write section 124 controls the RAM 14 so that the RAM 14 may write in the address "a" the data, as it is, that the CPU 100 (processing program 110) is going to write.

The operation of the data write section 124 will be described in further detail with reference to FIG. 7.

FIG. 7 is a flow chart showing the processing (S30) of the data write section 124 shown in FIG. 2. As shown in FIG. 7, at step 300 (S300) the CPU 100 (processing program 110) assigns an address "a," where the RAM 14 writes data, via the address bus (AD), and generates a control signal CNT with assigning data d that the CPU 100 (processing program 110) is going to write in the RAM 14 via the data bus (DATA). Further, the CPU 100 (processing program 110) issues the control signal CNT to the data write section 124 as a command WriteData (a, d) for writing data in the RAM 14.

At step 302 (S302), the data write section 124 reads a value of the register MR in the internal register 134, and if the value is 1 (thus, the memory controller 12 is enabled), the process goes to step 304, and if not, the process goes to step 314.

At step 304 (S304), the data write section 124 judges whether the address "a" is between the start address of the image buffer 140, which is held in the register SAR of the internal register 134, and the end address held in the registers EAR.

If the address "a" is within this range, the process in the data write section 124 goes to step 306, and if not, the process goes to step 314.

At step 306 (S306), the data write section 124 calculates a result r that is obtained by integer-dividing a value, obtained by subtracting the start address from the address "a," by the line width (FIG. 4) and block height(thus, r=(a−SAR)/LWR/BHR).

In addition, the data write section 124 calculates a value c that is obtained by integer-dividing a remainder, obtained by dividing a value, obtained by subtracting the start address from the address "a," by the line width (FIG. 4), by the block width (thus, c=(a−SAR)%LWR/BHR).

Further, the data write section 124 obtains a multiplication result i by multiplication of the calculation results r and c (thus, i=r×c)

In addition, this multiplication result i shows which buffer block SB[i] in the image buffer 140 (FIG. 4) includes the address "a."

At step 308 (S308), the data write section 124 reads a control vector CV[i], corresponding to the buffer block SB[i] in the image buffer 140 that is shown by the multiplication result i obtained at step 306, from the control vector section 130. Further, the data write section 124 judges whether a value of the control vector CV[i] is 1.

If the value of the control vector CV[i] is 1, the process in the data write section 124 goes to step 310, and if not, the process goes to step 314.

At step 310 (S310), the data write section 124 sets the value of the control vector CV[i], which is stored in the control vector section 130, to one.

At step 312 (S312), the data write section 124 sets the initializing data, stored in the pattern register 132, to the buffer block SB[i].

At step 314 (S314), the data write section 124 outputs to the RAM 14 the control signal (CNT') for writing the data d in the address "a," and controls the RAM 14 so that the RAM 14 may write the data d in the address "a."

The operation of the image data processing apparatus of FIG. 1 will now be described. In the memory controller 12 of the image data processing apparatus 1 (FIG. 1), the command processor 120 (FIG. 2) sets parameters of the image buffer 140 (FIG. 4), which are input via the data bus (DATA), to registers SAR, EAR, BWR, LWR, and MR of the internal register 134 respectively according to a command (Table 1), which is input from the CPU 100 (processing program 110) via a control bus, as described with reference to FIG. 5.

In addition, the command processor 120 reads the parameters, which are set in respective registers of the internal register 134, according to an inquiry from the CPU 100 (processing program 110), and sends back the parameters to the CPU 100 (processing program 110).

When the CPU 100 (processing program 110) issues the control signal CNT, which is used for reading data from the address "a" of the RAM 14, to the data read section 122 of the memory controller 12 (FIG. 2), the data read section 122 controls the RAM 14 that the RAM 14 may read data from the address "a" if the address "a" is out of the range of the image buffer 140 (FIG. 4) and may return the data to the CPU 100 (processing program 110), as described with reference to FIG. 6.

In addition, if the address "a" is within the range of the image buffer 140, the data read section 122 judges which buffer block SB[i] includes the address "a." If a value of a control vector CV[i] that is stored in the control vector section 130 and corresponds to this buffer block SB[i] is one, the data read section 122 controls the RAM 14 so that the RAM 14 may read data from the address "a" and may return the data to the CPU 100 (processing program 110).

Alternatively, if the address "a" is within the range of the image buffer 140 and the value of the control vector CV[i] corresponding to the buffer block SB[i] is zero, the data read section 122 controls the RAM 14 so that the RAM 14 may read data, corresponding to the address "a," from the pattern register 132 and may return the data to the CPU 100 (processing program 110).

When the CPU 100 (processing program 110) issues the control signal CNT, which is used for writing the data d in the address "a" of the RAM 14, to the data write section 124 of the memory controller 12 (FIG. 2), the data write section 124 controls the RAM 14. Therefore, the RAM 14 may write the data d in the address "a" if the address "a" is out of the range of the image buffer 140 (FIG. 4), as described with reference to FIG. 7.

In addition, if the address "a" is within the range of the image buffer 140, the data write section 124 judges which buffer block SB[i] includes the address "a." If a value of a control vector CV[i] that is stored in the control vector section 130 and corresponds to this buffer block SB[i] is one, the data write section 124 controls the RAM 14 so that the RAM 14 may write the data d in the address "a."

Alternatively, if the address "a" is within the range of the image buffer 140 and the value of the control vector CV[i] corresponding to the buffer block SB[i] is zero, the data write section 124 sets this control vector CV[i] to one. Further, the data write section 124 sets the initializing data, which is held in the pattern register 132, to the buffer block SB[i], and controls the RAM 14 so that the RAM 14 may write the data d in the address "a."

Again, FIG. 3 will be used as a reference. Even if an image is divided as shown in FIG. 3(A) and the same images, which construct a wall paper, are embedded in respective divisions conventionally (for example, in case of using cache memory), it is necessary to start processing after setting the initializing data to all of the buffer blocks SB[0] to SB[n] (FIG. 4).

According to the image data processing apparatus of FIG. 1, for example, where a figure "a" is rendered in a part of an image as shown in FIG. 3(B), it is sufficient to initialize buffer blocks corresponding to a small range b that is a part of the figure "a" as shown in FIG. 3(C). Therefore, it is not necessary to initialize the other part c. Therefore, according to the image data processing apparatus of FIG. 1, it is possible to save processing volume and processing time for initialization of buffer blocks corresponding to the part c. The initialization will now be described in further detail.

For example, if a cache memory system is used instead of the memory controller 12, the CPU 100 accesses all the buffer area of the RAM 14 so as to initialize the 128-MB buffer area. Hence, a hit ratio of the cache memory becomes extremely low. On the other hand, if the memory controller 12 is used, it is not necessary for the processing program 110 to access all the buffer area of the RAM 14, and it is sufficient just to initialize the control vector CV[i] of the memory controller 12. Therefore, it is possible to reduce the processing volume of the processing program 110 for initialization. In addition, when the processing program 110 accesses the image buffer 140 of the RAM 14, the memory controller 12 does not read data from an area, where the data has not been written, according to a value of the control vector CV[i]. Hence, it is possible to reduce the processing volume of the processing program 110 by the amount of data read from areas where data has not been written.

Further, in the cache memory system, an access of the CPU 100 to the RAM 14 is accelerated by copying the contents of a part of memory to a cache memory (making a local copy). Nevertheless, since this local copy is performed on the basis of locality of the program (processing program 110) or image data, this is not always optimized. On the other hand, according to the memory controller 12, it is sufficient just to store one bit of vector (control vector CV[i]) and the initializing data every buffer block SB[i] instead of this local copy. Therefore, the data volume to be stored is small, and the complicated memory control as in the cache memory system is not necessary. Further, mis-hits do not happen.

In addition, although such an example that the memory controller 12 is constructed in hardware is described as an embodiment, the memory controller 12 can be also constructed in software with using a program realizing the same operation. In addition, such an example that the same initializing data common to all the buffer blocks (FIG. 1) is set is described as an embodiment. Nevertheless, the memory controller 12 can be also modified so that an initializing data may be set to a buffer block with using any one of a plurality of initializing data by associating the plurality of initializing data with buffer blocks respectively through making it possible to set the plurality of initializing data in the pattern register 132.

Further, it is possible to enhance the performance of the image data processing apparatus of FIG. 1 by using the cache memory and the memory controller 12 at the same time. If the cache memory and the memory controller 12 are used at the same time, the initialization of memory that is necessary in case of using only the cache memory becomes unnecessary. When the CPU 100 accesses the RAM 14 for reading, a local copy (working set) read request is issued from the cache memory to the memory controller 12 according to necessity. The memory controller 12 judges whether it is necessary to actually access the RAM 14, and if necessary, the memory controller 12 actually reads the working set from the RAM 14. When the CPU 100 accesses the RAM 14 for writing, a local copy (working set) read request is issued from the cache memory to the memory controller 12 according to necessity. The memory controller 12 judges whether it is necessary to actually access the RAM 14, and if necessary, the memory controller 12 actually writes data from the cache memory in the RAM 14.

In addition, such an example that a word of data is stored in a buffer block of the image buffer 140 in the RAM 14 (FIG. 4) is described. If a plurality of words (m words) are stored in a buffer block SB[i], m words of initializing data are set in the pattern register 132 in response to this. In this case, if an address "a" of the buffer block SB[i], where data has not been written, is accessed, it is necessary for the memory controller 12 to calculate what word of the pattern register 132 corresponds to this address "a."

In this case, the data read section 122 of the memory controller 12 associates the address "a" with a word in the pattern register 132 by calculating a value i=(a−SAR)%LWR/p for the address "a", (where the value i shows the $i^{th}$ word of the pattern register 132, terms SAR and LWR show values set in the registers. SAR and LWR of the internal register 134 respectively, and a term p shows the size of the initializing data stored in the pattern register 132).

Application examples of the image data processing apparatus of FIG. 1 will now be described.

FIG. 8 is a block diagram showing the structure of a image codec 2 that is shown as an application example of the image data processing apparatus of FIG. 1 and the like. As shown in FIG. 8, the image codec 2, a CODEC 16 which performs compression-coding and decompression-decoding of image data is connected to the image data processing apparatus of FIG. 1.

The operation of the image codec 2 will be described. The CPU 100 (processing program 110) assigns any buffer block SB[i] of the image buffer 140 (FIG. 4) to the CODEC 16, and requests the compression of image data stored in the buffer block SB[i] assigned. Then, the CODEC 16 reads the image data from the RAM 14 via the memory controller 12, and performs compression-coding.

The memory controller 12 checks the control vector CV[i] of the control vector section 130. If this value is zero and data has not been written in the buffer block SB[i], the memory controller 12 judges that the new compression-coding of the data stored in the buffer block SB[i] is unnecessary. Then, the memory controller 12 indicates to the CODEC 16 that the data volume to be compression-coded is zero, or instructs the CODEC 16 that the compression-coding is not necessary. According to this instruction, the CODEC 16 can write a result of compression-coding in the RAM 14 without actually reading the contents of the buffer block SB[i] and without compression-coding.

When the CPU 100 (processing program 110) requests decompression-decoding of the data to be stored in the buffer block SB[i] of CODEC 16, the CODEC 16 checks the data compression-coded. If the CODEC 16 judges that the data length is zero and hence the data is an empty data, the CODEC 16 zero-clears the control vector CV[i] with the command ClearBlock (Table 1). In addition, if not the empty data, the CODEC 16 decompression-decodes the data in the buffer block SB[i].

FIG. 9 is a block diagram showing the structure of a printer controller 3 that is shown as an application example of the image codec 2 shown in FIG. 8. As shown in FIG. 9, the printer controller 3 includes: a printer control section 4; a computer (PC) 30; an engine controller 32; and a printer engine 34. The printer control section 4 includes a memory controller 12, an IEEE-1284 interface 300, a decoder 302, a video interface (IF) 304, an image codec 2 (FIG. 8), and CPU 100. The CPU 100 executes the rasterizer 142 stored in the RAM 14. The CPU 100 is connected to the memory controller 12, the IEEE-1284 interface 300, the decoder 302, the video interface (IF) 304, and the image codec 2 (FIG. 8) by a Bus 102.

In addition, decoder 302 is provided in the printer controller 3 besides the CODEC 16 for the following purposes. Both processing of outputting image data (band), stored in the RAM 14 after compression-coding, to the printer control section 4 after decompression-decoding, and the processing of decompression-decoding for rendering are executed in parallel in the CODEC 16, which can cause the data being processed to pile up. It is possible to prevent occurrence of parallel decompression-decoding in the CODEC 16 by providing the decoder 302 besides the CODEC 16.

The computer 30 among these components of the printer controller 3 generates image data that is printed by the printer controller 34, and outputs the image data to the printer control section 4. The IEEE-1284 interface 300 is a standard connecting method in printers, and transmits and receives data between the computer 30 and printer control section 4. The rasterizer 142 generates a raster image by processing the image data input from the computer 30, and outputs the raster image to the engine controller 32 via the decoder 302 and video interface 304. The engine controller 32 prints the raster image input from the printer control section 4 by controlling the printer engine 34.

Inside a printer and an MFP (Multi-Function Peripheral), data processing is required. For example, the data volume of A-4 size black and white image data at 600 dpi is nearly 4 MB. The data volume of full color image data having the same resolution and size as the black and white image data is 32 times larger (nearly 128 MB). By using the printer controller 3, it becomes possible to accelerate an access to the RAM 14, and to reduce data transfer volume, at the time of print data generation, by reducing an access frequency to the RAM 14.

Image data to be printed is generated in the computer 30, and is transferred to the printer control section 4. In the printer control section 4, the rasterizer 142 generates image data, which is called a raster image, by performing the rendering of this image data. In this rendering, the rasterizer 142 accesses the image buffer 140. The memory controller 12, as described above, does not initialize this buffer block until data is written in this buffer block, and initializes this buffer block for the first time when data is first written in this buffer block.

Therefore, by using the memory controller 12, it becomes possible to omit initialization of memory where image data, except the initializing data, has not been written, until the end of the processing, as shown as the part c in FIG. 3(C). Therefore, it is possible to reduce the access frequency and data transfer volume of the rasterizer 142 to the RAM 14.

In addition, depending on a processing method of the rasterizer 142, it is possible for the memory controller 12 to reduce the access frequency and data transfer volume of the rasterizer 142 to the RAM 14 in the printer controller 3 by setting the size of the buffer block.

When the rendering of a part of the image data (this is also called a band) is finished, the rasterizer 142 temporarily stores the band in a part of the RAM 14, outside the image buffer 140, by compression-coding the band. Although this compression-coding is performed by the CODEC 16, the access frequency to the RAM 14 and the like in company with this compression-coding are reduced by the memory controller 12 as described above with reference to FIG. 8.

When the rendering and compression-coding of all the image data (bands) are finished, the rasterizer 142 decompression-decodes bands, which are temporarily stored in the RAM 14 and are compression-coded, with using the decoder 302. Further, the rasterizer 142 outputs the bands to the engine controller 32 via the video interface 304. Similarly at the timing of the compression-coding, the access frequency to the RAM 14 and the like in company with this decompression-decoding are sharply reduced by the memory controller 12 as described above with reference to FIG. 8.

The memory controller 12 is able to accelerate access speed to memory and to reduce the access frequency so as to process image data efficiently.

Although, in the example shown in FIG. 3, 16×12 (=192) buffer blocks exist in the image buffer 140, the number of buffer blocks accessed is only 14 (6% of the total). In this manner, by paying attention to the fact that background data (=initializing data) of the data to be printed is blank or a simple pattern in many cases, and that foreground data (for example, a graphic image shown in FIG. 3(B)) is not dense but fairly sparse, it becomes apparent that it is effective to use the memory controller 12.

As described above, according to the memory access control apparatus and method of the present invention, it is possible to reduce memory access frequency in the processing of handling high volume data such as graphic printing.

In addition, according to the memory access control apparatus and method of the present invention, it is possible to reduce memory access frequency in graphic printing and the like, where conventional methods, for example, cache memory, fail to achieve lower frequencies.

In addition, according to the memory access control apparatus and method of the present invention, it is possible to reduce the access frequency and the number of accesses to memory by making it unnecessary to access memory areas where data has not been written or modified.

What is claimed is:

1. A memory access control apparatus comprising:
  input for accepting assignment of a plurality of blocks set in a storing area of memory where data can be read and written and managing whether data writing has already occurred or not to each of the blocks;
  read access control means for accepting setup of initializing data written in the plurality of blocks at first and sending back the data written in any one of the plurality of blocks or the initializing data set to the block to an access source according to whether data writing has already occurred or not to the block when a read access occurs to the block; and
  write access control means for accepting setup of initializing data written in the plurality of blocks at first and writing the initializing data that has been set and data to be written with a write access in any one of the plurality of blocks, or the data to be written, in the block according to whether data writing has already occurred or not to the block when the write access occurs on the block.

2. The memory access control apparatus according to claim 1, wherein, in the read access control means, the initializing data is commonly set to the plurality of blocks.

3. The memory access control apparatus according to claim 1, wherein, when a read access occurs to any one of the plurality of blocks, the read access control means sends back data to an access source after reading the data from the block if the data has already been written in the block, and if not, the read access control means sends back the initializing data that has been set to the block to the access source.

4. The memory access control apparatus according to claim 1, wherein, in the write access control means, the initializing data is commonly set to the plurality of blocks.

5. The memory access control apparatus according to claim 1, wherein the write access control means writes the data to be written in any one of the plurality of blocks if data has already been written in the block when a write access occurs to the blocks, and if not, the write access control means writes the initializing data in the block, and writes the data to be written to make the block in a state that the written data is written.

6. A memory access control method comprising the steps of:
   accepting assignment of a plurality of blocks set in a storing area of memory where data can be read and written, and managing whether data writing has already occurred or not to each of the blocks;
   accepting setup of the initializing data that is first written in the plurality of blocks; and
   sending back data, which is written in any one of the plurality of blocks, or the initializing data, which is set to the block, to an access source according to whether data writing has already occurred or not to the block when a read access occurs to the block.

7. A memory access control method comprising the steps of:
   accepting assignment of a plurality of blocks set in a storing area of memory where data can be read and written, and managing whether data writing has already occurred or not to each of the blocks;
   accepting setup of the initializing data that is first written in the plurality of blocks; and
   writing, the initializing data that has been set and data to be written in the blocks with a write access, or the data to be written in the blocks, in this block data according to whether data writing has already occurred or not to the blocks when the write access occurs to the blocks.

8. A memory controller for generating a control signal for read and write that controls an operation of a random access memory (RAM) according to a command issued by a central processing unit (CPU), wherein the memory controller further comprises:
   a control vector section for storing a plurality of control vectors, the plurality of control vectors for indicating which of a plurality of buffer blocks, of an image buffer, contain data;
   a pattern register for storing an initializing data set to the plurality of buffer blocks of the image buffer in the RAM;
   an internal register for storing a setup of respective parameters of the image buffer; and
   a command processor for reading data stored in the control vector section, pattern register section and internal register section, and informing the CPU of the data.

9. The memory controller of claim 8, wherein the memory controller enables the CPU to perform an image processing operation which initializes the portion of the image buffer in RAM containing data as indicated by the control vector section.

10. The memory controller of claim 8, wherein the internal register stores parameters comprising:
   a start address of the image buffer;
   an end address of the image buffer;
   a block width of the plurality of buffer blocks;
   a line width of the RAM; and
   a flag for indicating whether the memory controller is operable.

* * * * *